No. 843,672. PATENTED FEB. 12, 1907.
W. FETZER.
DISK HARROW WITH TONGUE TRUCK.
APPLICATION FILED MAY 23, 1906.
2 SHEETS—SHEET 2.
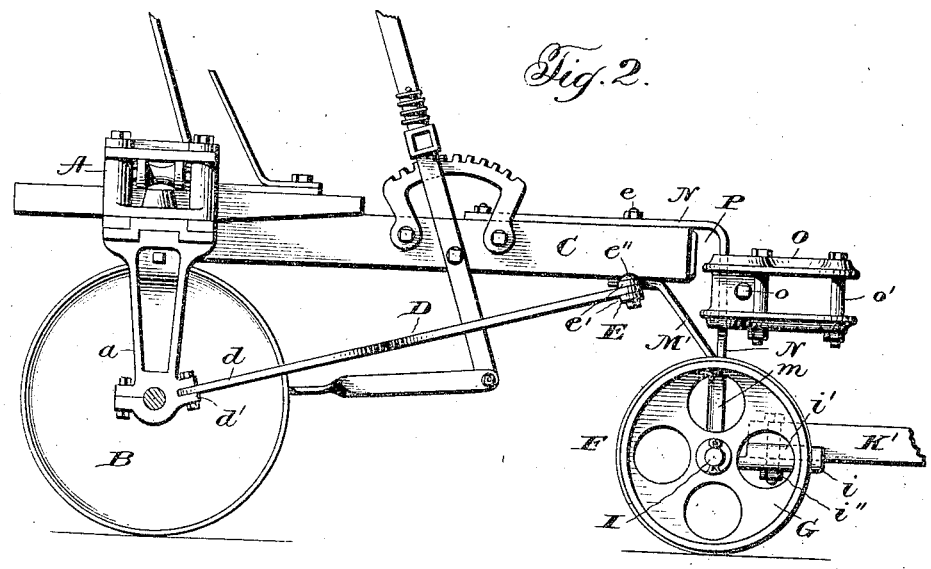
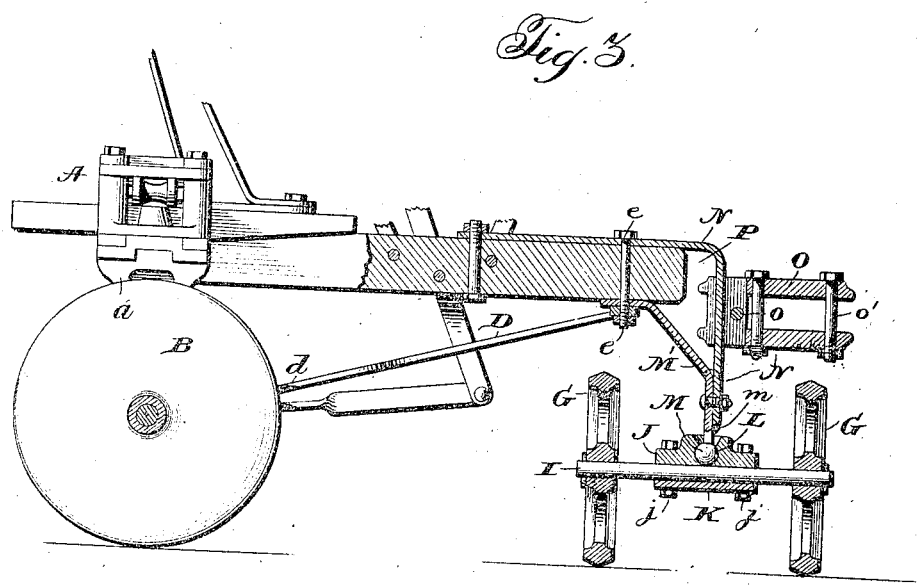
Witnesses:
Jas. E. Hutchinson.
Willis F. Rowe
Inventor:
William Fetzer,
By his Attorneys.

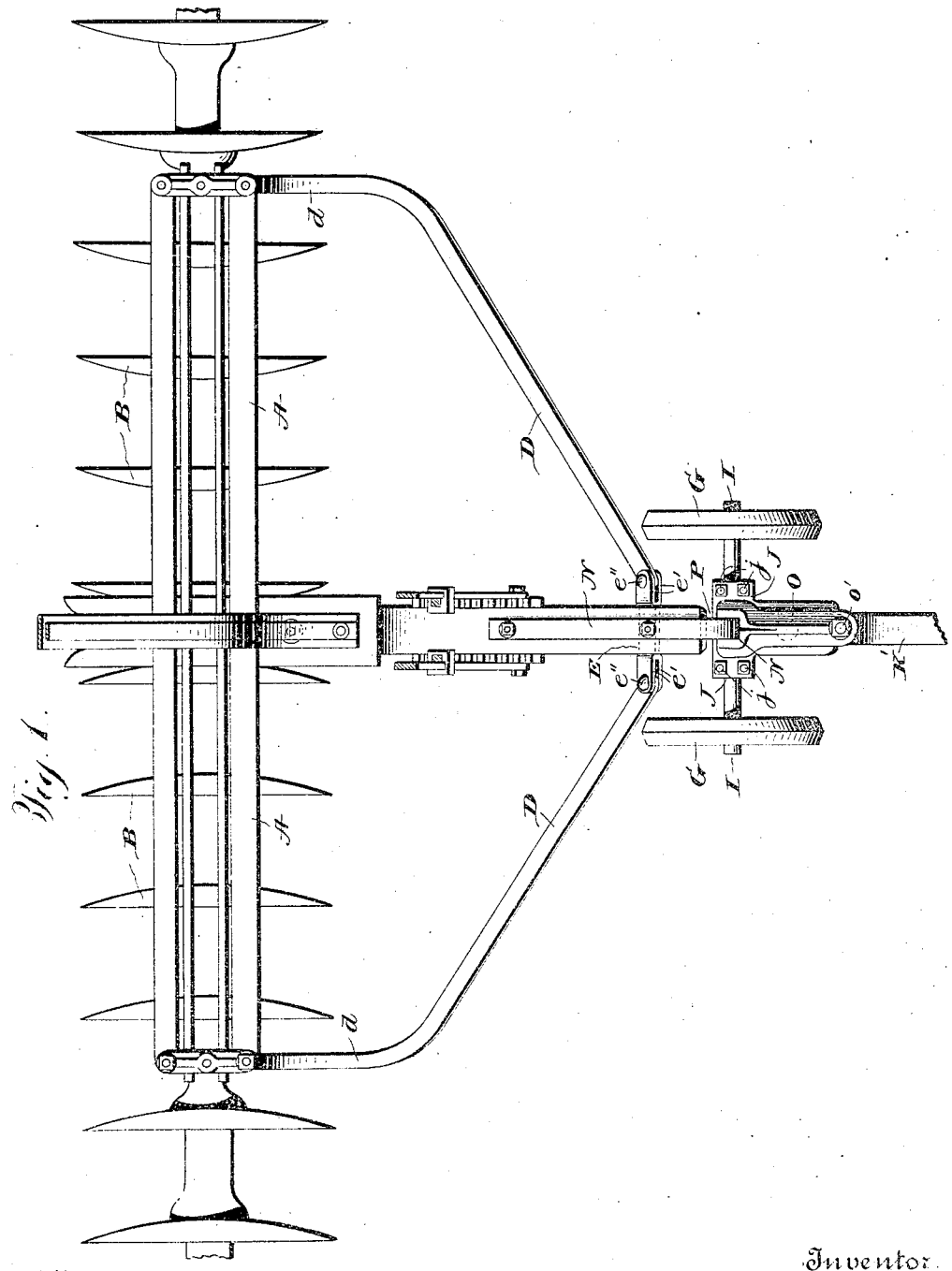

UNITED STATES PATENT OFFICE.

WILLIAM FETZER, OF MIDDLETOWN, OHIO.

DISK HARROW WITH TONGUE-TRUCK.

No. 843,672.   Specification of Letters Patent.   Patented Feb. 12, 1907.

Application filed May 23, 1906. Serial No. 318,339.

*To all whom it may concern:*

Be it known that I, WILLIAM FETZER, a citizen of the United States, residing at Middletown, in the county of Butler and State of Ohio, have invented certain new and useful Improvements in Disk Harrows with Tongue-Trucks, of which the following is a specification, reference being had therein to the accompanying drawings.

This invention relates to improvements in disk harrows with tongue-truck, primarily designed for the purpose of overcoming the side draft, jarring, and excessive neck-weight incident to the heavy downward pulling of the ordinary disk-harrow tongue upon the neck of the horses or other draft-animals and also to overcome the dangers and possibilities of the outside horses (three or four being commonly used) getting their feet back into the disks, where they are liable to be seriously injured.

Novel characteristics of a convenient embodiment of the invention include a two-wheel tongue-truck on a disk harrow; the fastening of the tongue proper at or below the stub-tongue on a disk harrow; the fastening of the tongue of a disk harrow between two truck-wheels; a jaw or hitch for fastening and securing the evener-bar to the stub-tongue in such a way as to prevent the evener-bar playing or turning beyond a certain degree, whereby to prevent the possibility of the horses getting back against the disks, as above suggested; a tongue-truck for disk harrows having a universal-joint fastening between the truck and the harrow; a disk harrow with a truck suitable for fastening the tongue below the eveners; a disk harrow with tongue-truck and an adjustable hitch for hitching high or low according to a large or small size team; pull-hounds extending from the center of the disk-sections up to the hitch and immediately under the stub-tongue, whereby to provide a very direct hitch, and the wheels of the truck having the surface thereof ridged in the center and narrowed to both edges, whereby dirt and mud will not stick thereto, and the same will, in effect, be self-cleaning.

All the foregoing features of my present invention, as also the details of construction and arrangement of the several parts of the machine constituting the before-mentioned convenient embodiment of the invention, will be apparent from the detailed description hereinafter contained, when read in connection with the accompanying drawings, forming part hereof, and wherein such machine is illustrated.

In the drawings, Figure 1 is a sectional view; Fig. 2, a top plan view, and Fig. 3 a side elevation.

Referring more specifically to the drawings, wherein like reference characters refer to corresponding parts in the several views, A represents the frame of a disk harrow, which may be of any ordinary or preferred construction; B, the harrow-disks, and C a stub-tongue projecting forwardly from said frame and disks.

D are pull-hounds, one at each side of the stub-tongue C and secured to the forward end portion of said stub-tongue through the medium of a coupling E, bolted to the under surface thereof by a bolt $e$, said coupling having separated ears $e'$ at its ends for the reception of and within which the ends of the pull-bars are secured, pins $e''$ being provided therefor.

The rearmost extension $d$ of the pull hounds or bars are straight, as at $d$, so as to enter between a pair of the disks of each harrow-section, approximately at the center thereof, and be secured to the uprights or brackets $a$ of the frame A, the manner of fastening the parts together being clearly shown at $d'$. Of course the main portion of each of the pull-hounds is offset with respect to the extension $d$ and inclined forwardly and inwardly therefrom to the stub-tongue C, to which latter it is secured, as hereinbefore stated.

F represents the tongue-truck, the same comprising a pair of wheels G, the engaging surfaces or peripheries of which are centrally ridged and narrowed or beveled toward the edges of the wheels, whereby they will be self-cleaning, it being practically impossible for dirt and mud to accumulate to any substantial extent on such peripheries.

I is the axle of the truck, which passes through and is clamped within a two-part casting, which will now be defined. K is the bottom half of this casting, which has a groove semicircular in cross-section in its upper surface adapted to receive the axle I and a forward extension $i$, flanged at its edges, as at $i'$, forming a seat within which the tongue proper, K', fits, and is bolted, as at $i''$.

J is the upper member or part of the casting formed in general complementary to the lower member I, whereby to fit over the axle from above the same, the two parts being rigidly secured together and the axle clamped therebetween by means of any suitable fastening devices, in the present instance shown as bolts j. On the member J, centrally thereof, I form a socket L, adapted to receive a ball M and coöperate therewith in forming a universal joint for the truck, this ball being in turn rigidly carried by and preferably formed integrally with a combined supporting-arm and brace M', the lower end of which is approximately vertically disposed and flanged, as at m, for a purpose as will presently appear, while the upper end of which is bent rearwardly slightly and offset at its upper extremity to immediately underlie the stub-tongue C and overlie the coupling E, whereby the securing means for said coupling also serves as a securing means for said offset extremity, as will be apparent from an inspection of Fig. 3. This combined supporting-arm and brace M' coöperates with a strap of metal N to constitute a support for an adjustable clevis or hitch O, the relation of the member M' and strap N being such that they mutually serve to strengthen each other.

As will be appreciated from the drawings, the strap N overlies and is secured to the upper surface of the stub-tongue C through the medium of a horizontal portion and also depends and is rigidly secured to the member M' through the medium of a vertical portion, the juncture between the horizontal and vertical portions being carried forward beyond the front end of the stub-tongue, whereby to afford a space P, within which the clevis O may be slipped up and down to accommodate a large or small size team. The clevis is provided with clamping means o and a pivot-pin o', on which the evener-bar is mounted to swing to a limited extent only, the rear sides of the clevis preventing said evener-bar playing or turning beyond a certain degree, thus preventing the possibility of the horses getting back against the disks B.

By locating the tongue K' below the eveners any interference on the part of the latter to the operation of the device is obviated.

The universal connection for the tongue-truck, while permitting the same to conform to irregularities of ground-surface, serves the additional and valuable function of relieving the bearing of the extreme pressure and strain incident to the leverage inherent in an association of parts in a rigid structure—as, for instance, where a single truck-wheel is carried by a swivel-post.

It is also to be noted that the two-wheel-truck idea is believed to be fundamental in this art, and the advantages thereof, though perhaps apparent, may be stated to be the making practical of a single-wheel device, which latter when alone relied on is disposed to sink down into soft or muddy ground and also to creel, especially after the bearings have become loosened up a little, and which if made very wide to overcome these tendencies has no bearings adequate to hold it.

The special arrangement of the parts of the combined disk harrow and tongue-truck herein described or as specified in the claims, with the tongue proper secured to the truck "at a point below the plane of the axis of the disks" or "at a point located within the planes of the axis of the disks and the lower edges thereof" or "at a point to exert a downward pressure on the truck and stub-tongue when the tongue proper is subjected to backward pull" or "at a point adjacent the plane of the axis of the disks" possesses a highly-desirable characteristic in that practically all tendency of the stub-tongue and truck to rock upon the disks and be forced upwardly and rearwardly incident to the backward pull on the tongue, as would be the case where the tongue proper is secured to the truck at a point substantially above the plane of the axis of the disks, is effectually overcome and the function of effecting a downward pressure on the forward end of the stub-tongue and truck during such backward pull of the tongue proper secured.

I claim—

1. The combination with a support, of harrow-disks thereon, a stub-tongue projecting forwardly from a point above the disks, a truck comprising a pair of wheels universally connected to the forward end of said stub-tongue, and a tongue proper secured to said truck at a point below the plane of the axis of the disks and projecting forwardly from the truck, in combination with a hitch arranged above the truck.

2. The combination with a support, of harrow-disks thereon, a stub-tongue projecting forwardly from a point above the axis of the disks, a truck connected to the forward end of said stub-tongue, and a tongue proper secured to said truck at a point located within the planes of the axis of the disk and the lower edges thereof and projecting forwardly from the truck, in combination with a hitch arranged above the truck.

3. In a disk harrow, the combination with a frame located above the plane of the disks, a stub-tongue having its rear ends secured to the frame and projecting forwardly from the frame and above the plane of the disks, a tongue-truck flexibly secured to the forward end of the stub-tongue and located below the stub-tongue, a hitch located adjacent the forward end of the stub-tongue, and a tongue proper secured to the truck at a point adjacent the axis thereof and below the plane of the stub-tongue.

4. In a disk harrow, the combination with the harrow-disks, of a stub-tongue projecting forwardly from a point above the axis of the disks, a tongue-truck flexibly secured to the outer end of the stub-tongue and located below the same, a hitch above the truck, and a tongue proper secured to the truck at a point adjacent the plane of the axis of the disks.

In testimony whereof I affix my signature in presence of two witnesses.

WILLIAM FETZER.

Witnesses:
F. W. CLISE,
G. A. SULLIVAN.